Dec. 14, 1971   W. S. DESPAIN ET AL   3,626,542
GUTTER CLEANING TOOL
Filed Feb. 25, 1970   3 Sheets-Sheet 1
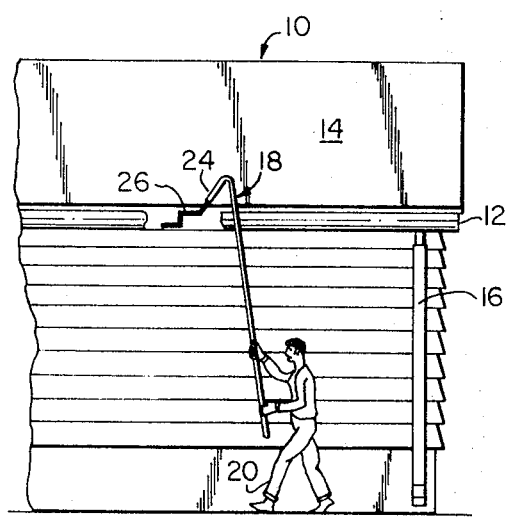
FIG. 1
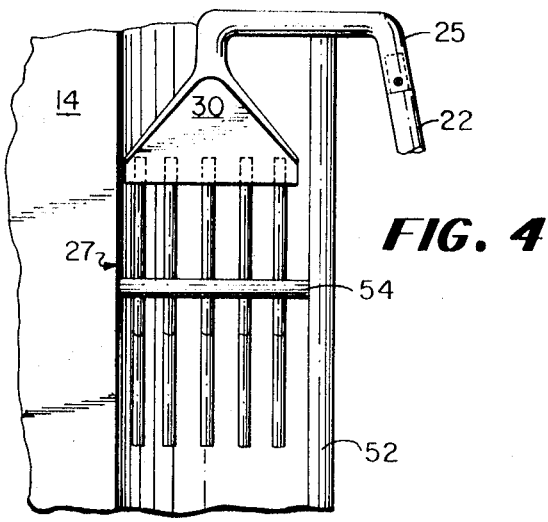
FIG. 4
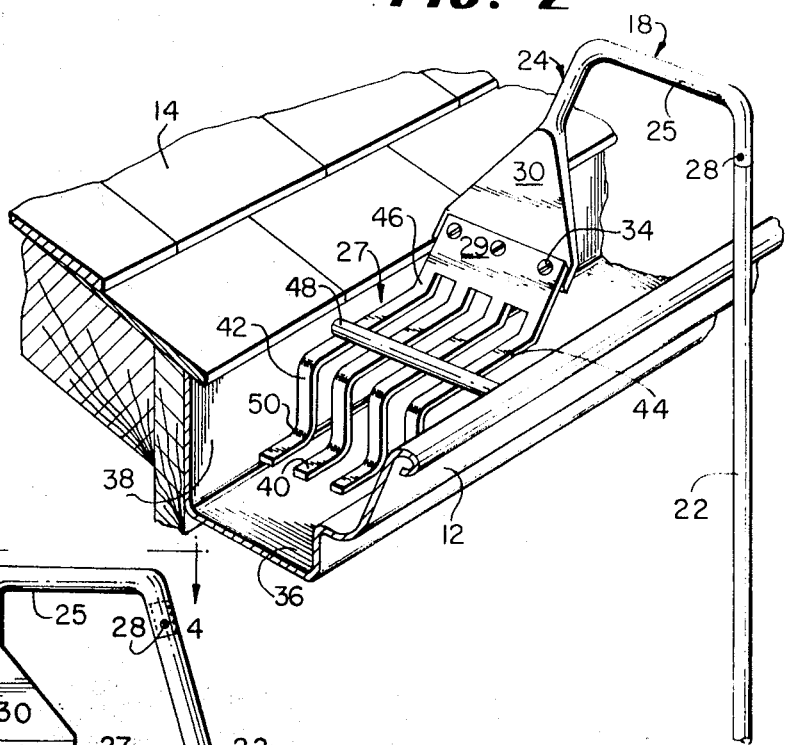
FIG. 2
FIG. 3
INVENTOR.
WILLIAM S DESPAIN
JAMES E BLEVINS
BY
Jacobi, Davidson, Lilling & Siegel
ATTORNEYS Dec. 14, 1971 W. S. DESPAIN ET AL 3,626,542
GUTTER CLEANING TOOL
Filed Feb. 25, 1970 3 Sheets-Sheet 2

INVENTOR.
WILLIAM S DESPAIN
JAMES E BLEVINS
BY Jacobi, Davidson, Lilling & Siegel
ATTORNEYS

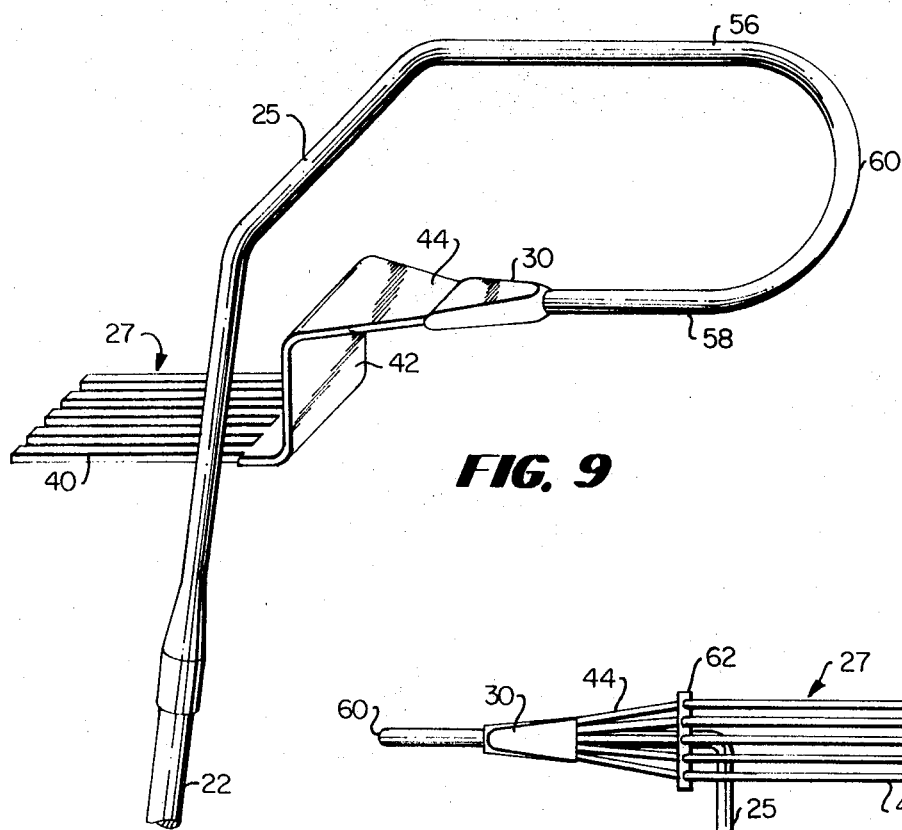
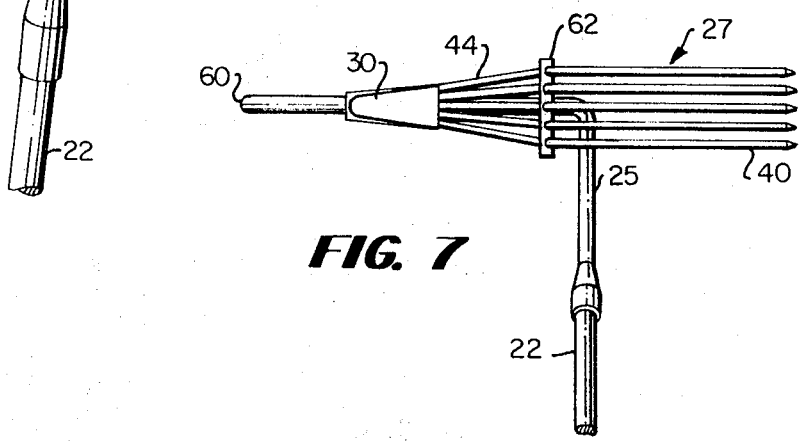
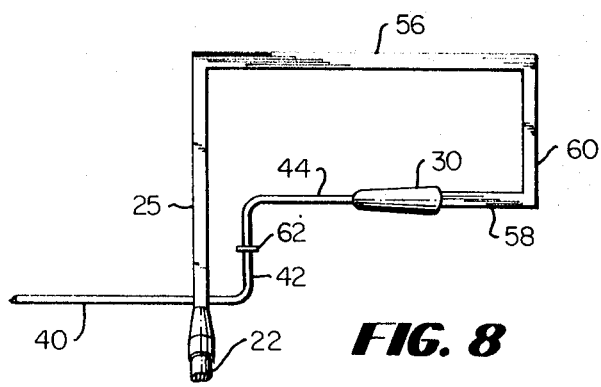

United States Patent Office 3,626,542
Patented Dec. 14, 1971

3,626,542
GUTTER CLEANING TOOL
William S. Despain, 1725 Darrel Drive, Titusville, Fla. 32780, and James E. Blevins, 1948 Barkley Ave., Eau Gallie, Fla. 32935
Filed Feb. 25, 1970, Ser. No. 14,030
Int. Cl. E04d *13/06*
U.S. Cl. 15—236                               8 Claims

ABSTRACT OF THE DISCLOSURE

An implement is disclosed for cleaning leaves and other debris from elevated house gutters, including a tool portion comprising a plurality of substantially parallel horizontal tines and an elongated, substantially vertical handle portion secured thereto to permit manipulation of the tool portion by a person standing on the ground. In its preferred form, the tool portion includes a step-like vertically offset portion which enables the tines to fit underneath a typical overhead hanger bracket for the gutter.

BACKGROUND OF THE INVENTION

The present invention relates generally to cleaning implements, and more specifically to an implement for cleaning out leaves and other debris from elevated roof gutters. Still more specifically, the present invention relates to such an implement adapted to be manually operated by a person standing on the ground.

It is a common problem that leaves, twigs and other debris tend to collect in the roof gutters of homes and other buildings, and if not periodically removed, accumulate to the point of interfering with the drainage function of the gutter. This problem may become particularly acute when the leaves are matted down or compacted, inasmuch as they then can clog the downspouts or conductors, and are particularly difficult to remove.

In order to remove the debris that collects in a gutter, the home owner or other person must either climb up to the gutter by way of a ladder placed alongside the gutter, or must climb onto the roof, and then proceed to clean the gutter usually with the help of a small garden tool such as a rake or the like. This procedure is laborious, time-consuming, and can even be dangerous. For elderly people, women, or others who may find it difficult or injurious to their health to climb a ladder to clean up the roof gutters, the job therefore presents a significant and substantial problem.

It has therefore been proposed to provide implements for cleaning gutters by a person standing on the ground. Frequently, many of these devices have required that the operator thereof perform particular manipulative steps in order to remove the debris from the gutter, which manipulation requires some skill and previous experience in operating the implement to do an effective job. Other proposed implements have been found to not be particularly satisfactory in removing leaves or other debris which have become matted down or compacted within the gutter.

An additional problem which arises when these known implements are used, involves the difficulty in removing the debris which becomes stacked up in the gutter at the points where transversely extending hanger braces or spikes which pass over or through the gutters are used to secure the gutters to the building.

SUMMARY OF THE INVENTION

With the above background in mind, it is an object of the present invention to provide an implement for cleaning roof gutters or the like which overcomes the above-mentioned drawbacks of known prior-art cleaning implements.

Specifically, it is a primary object of the present invention to provide an implement for removing leaves and other debris from roof gutters for use by a person standing on the ground that is easy to use, and requires a minimum of skill and little or no previous experience with the implement.

It is a further object of this invention to provide a gutter cleaning implement for use by a person standing on the ground which incorporates a plurality of cleaning elements which are adapted to enter the gutter from above and which are designed to substantially fit the contour of the bottom of the gutter.

Another object of the present invention is to provide such a gutter-cleaning implement for use by a person standing on the ground which enables the debris to be readily pushed under and cleaned away from a transversely extending gutter hanger member.

It is a further object of this invention to provide an implement for removing leaves and other debris from roof gutters by a person on the ground that is light-weight, durable, and is economical to manufacture.

These as well as other objects which will become apparent as the description proceeds, are fulfilled by the provision of the inventive gutter-cleaning implement characterized by an elongated handle provided at one hand with a tool head extending laterally from the handle and rearwardly toward its other end. The tool head is provided with a plurality of separate tool elements in the form of resilient tines or fingers secured thereto, which extend substantially parallel to the longitudinal axis of the roof gutter when the implement is in operative position. The tool head member and tines or fingers generally resemble in appearance a lawn rake. The tines are bent upwardly at their free ends to provide generally horizontally extending base portions which may make a sliding contact with the bottom of the gutter in one mode of operation. The tines may additionally have two additional bends between their free ends and the ends which are secured to the head member to produce a step-like, vertically offset portion elevated above the horizontally extending base portions, which elevated horizontal portions of each of the tines are designed to pass under a transversely extending gutter hanger member.

BRIEF DESCRIPTION OF THE DRAWINGS

The invention itself will be better understood, and additional advantages and features thereof will become apparent, from the following detailed description of preferred embodiments of the invention, taken in conjunction with the accompanying drawings, in which:

FIG. 1 is an elevational view of a portion of house provided with a conventional roof gutter, illustrating a first embodiment of the implement according to the present invention being used by a person standing on the ground;

FIG. 2 is an enlarged fragmentary view in perspective of the implement of FIG. 1 in operative position;

FIG. 3 is a front view of the upper portion of an alternate form of the implement of FIG. 1, designed to clean a half-round gutter;

FIG. 4 is a to plan view looking along the lines 4—4 of FIG. 3;

FIG. 7 is a bottom view of the device shown in FIG. 6;

FIG. 8 is a front view of a modified form of the apparatus shown in FIG. 5; and, FIG. 9 is a perspective view of a further modified form of the invention shown in FIG. 5.

DETAILED DESCRIPTION OF THE INVENTION

Figures 5, 6:
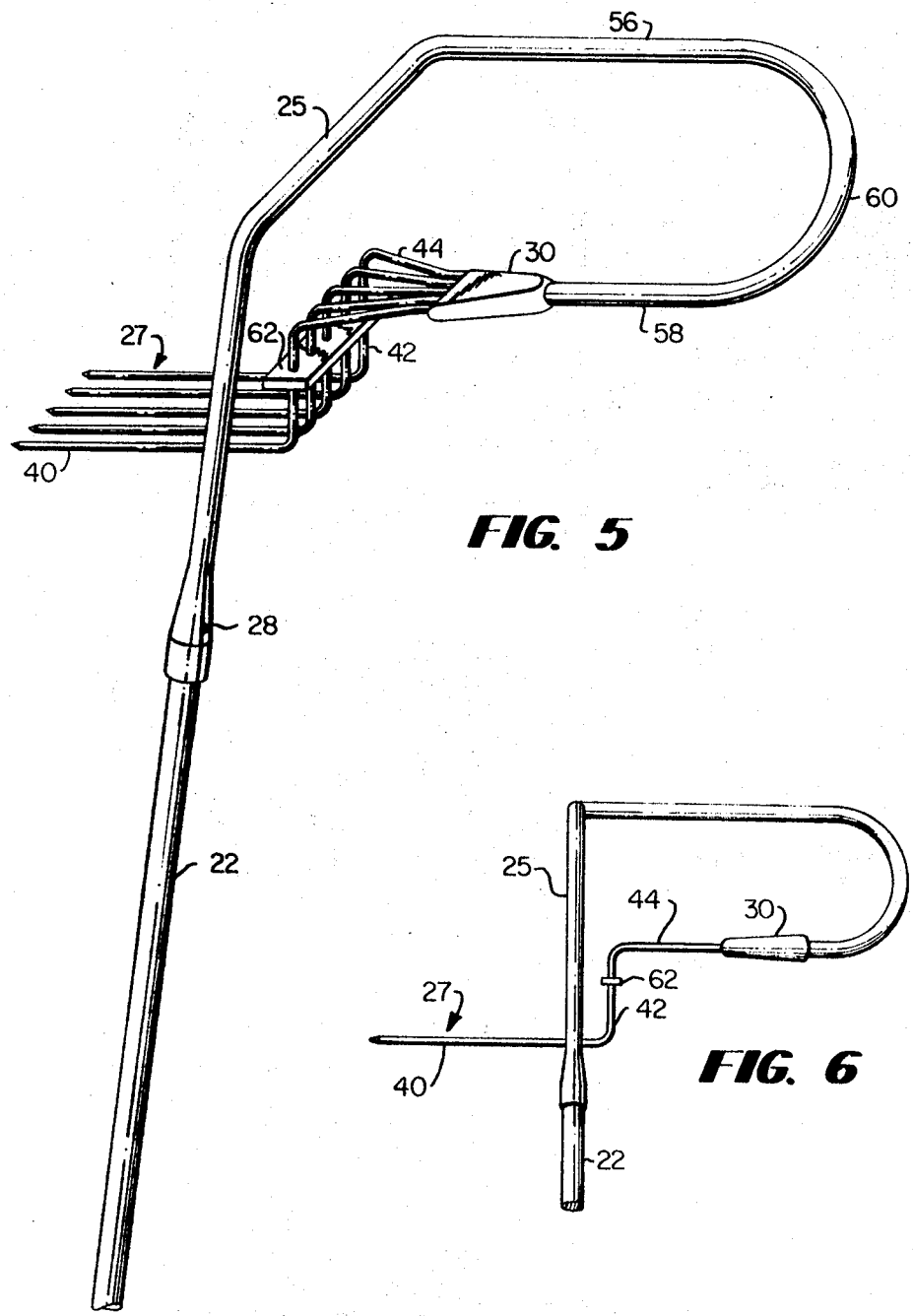
FIG. 5 is a perspective view of an alternative embodiment of the invention.
FIG. 6 is a front elevational view of the upper portion of the embodiment of FIG. 5.

Referring now to the drawings, in FIG. 1 there is shown a portion of a house 10 having a generally horizontally extending gutter 12 installed beneath the eaves of a roof 14 and provided with a down spout or conductor pipe 16 for carrying away rain water from the gutter 12. An implement generally designated as 18, constructed according to this invention, is shown being held in operative position by a person 20 standing on the ground below the gutter 12, for removing leaves and other debris from the gutter. The implement 18 comprises an elongated handle member 22, a tool head member 24 secured to the upper end of the handle 22, and tool means 26 secured to the head 24 and extending downwardly and outwardly therefrom into the gutter 12. The tool means 26 is adapted to engage the bottom of the gutter and to be moved along the gutter for removing the leaves and other debris present therein. To operate the implement 18, the operator 20 merely walks along the side of the house and pushes the implement along the gutter 12 to thereby move the debris along the bottom of the gutter. The debris may then be removed from the gutter 12 by moving the implement upward and to the side of the gutter.

Referring now to FIG. 2 for a more complete understanding of the construction of one embodiment of the present invention, and the manner in which it achieves its gutter-cleaning action, it will be seen that the tool means 26 which extends downwardly from an arm or bracket 25 of the head member 24, resembles a fork-like or rake-like device with a plurality of bent tines 27 arranged in side-by-side, spaced-apart relation. The elongated handle member 22 is of a sufficient length to enable the operator to reach up to and above the gutter 12, and may be constructed either in one piece or from a plurality of separably connected sections (not shown).

The bracket 25 which supports the tool head 24 and the tool means 26 is secured to one end of the handle 22 by means of a suitable fastening means 28. This end becomes the upper end of the handle 22 in the implement 18 being used. The head member 24 may be tubular in construction and may be fitted over a reduced end portion of the handle 22 to provide a simple connection therebetween. The bracket or arm 25 extends laterally outwardly from handle 22 and supports a generally flat triangular-shaped tool holder 30 which extends in a generally downward direction when the implement is in operative position. The tool holder 30 may extend downwardly and at a slight angle from the longitudinal axis of handle 22, as may be seen more clearly in FIG. 1. The bracket 25 and the tool holder 30 which form the head member 24 may be fabricated in one piece, or these may be fabricated as separate parts and joined together in a suitable fashion, if desired. The tool holder 30 is oriented with the side-by-side tines 27 aligned substantially parallel to the longitudinal axis of the gutter 12 when the implement is in operative position, and spaced transversely across the width of the gutter.

The individual tool elements or tines 27 which perform the improved cleaning action of this invention may be made from a flat piece 29 of spring steel that has been stamped or properly cut-out as shown in FIG. 2. In this embodiment, the tines have a substantially flat or rectangular cross-section, and may be conveniently attached to the tool holder 30 adjacent its lower edge by means of suitable fastener means 34. The tines 27 may be bent into the desired shape before or after they are secured to the holder 30. Each of the tines 27 is preferably bent in a step-like configuration and has a forwardly extending generally horizontal lower base portion 40, a generally vertically extending leg portion 42, secured to the rear end of the lower base portion 40, a generally horizontally extending upper step portion 44 extending rearwardly from the upper end of the leg portion 42, and a connector portion 46 substantially parallel to the face of the tool holder 30 and secured thereto.

The gutter 12 shown in FIG. 2 is a box-type or square gutter and has a flat bottom portion 36 which extends generally at right angles to an inner upwardly extending side wall 38. For this type of gutter, all of the tines 27 are approximately the same length in order that the free ends of the tines will engage the gutter bottom 36 when implement 18 is manipulated.

The particular step-like configuration of each of the tines 27 enables the implement 18 to clean gutters which are supported by hangers or braces which extend transversely of the gutters and above the bottoms. One type of such a hanger is shown as spike 48 supporting the gutter 12. As shown in FIG. 2, the vertical distances between the undersurfaces of the lower base portions 40 and the top surfaces of the upper step portions 44 of the tines 27 are slightly less than the vertical distance between the lower edge of the spike 48 and the surface of the gutter bottom 36, whereby the upper step portion 44 may readily pass under this spike 48. By this construction, debris which piles up ahead of the vertical leg portions 42 may be easily pushed under and past the spike 48. The bent tines 27 also provide an effective means for dislodging matted-down leaves from the bottom of the gutter. The leaves may be dislodged by pivoting the tines rearwardly about a plurality of fulcrums 50 formed by the outer corners of the bends between the lower base portions 40 and the leg portions 42.

The modified form of the cleaning implement shown in FIGS. 3 and 4 includes substantially all of the features of the device shown in FIG. 2, but is modified for use with a half-round type of gutter 52. In this case, the lengths of the tines 27 vary, and in particular, the lengths of the leg portions 42 vary to match the rounded contour of the bottom of the gutter 52. As in the case of the embodiment of FIG. 2, the tines 27 may be step-shaped to pass underneath a hanger spike 54. The tines of the implement of FIGS. 3 and 4 may preferably have circular cross-sections and may be formed from spring steel rods. These rod-like tines may be fabricated separately and secured individually to the tool holder 30 by any appropriate method.

In FIGS. 5 through 9 there is illustrated a basic alternative embodiment of the invention wherein the bracket 25 is given an alternate configuration to provide better balance of the device. In these figures, the bracket 25 has a rearwardly extending, generally U-shaped portion comprising an upper leg portion 56 secured to the transverse portion of the bracket 25 and thereby to the handle 22, a lower leg portion 58 secured to the tool holder 30, and a generally rounded base portion 60 connecting the upper and lower leg portions 56 and 58. Preferably, as shown, the upper and lower leg portions 56 and 58 extend rearwardly (i.e., opposite the direction of the free ends of the tines 27) a distance approximately equal to the length of the tines 27, to provide a proper front-to-back balance of the implement relative to the handle 22. In other respects, the implement according to this embodiment substantially corresponds to those shown in FIGS. 1 and 2 and FIGS. 3 and 4, and may comprise either rounded spring steel rods, as shown in FIGS. 5 through 8, or may comprise flat steel fingers or the like stamped from sheet metal, as shown in FIG. 9. In the event that rounded steel rods are utilized, preferably a connector member 62 is provided extending transversely across and connected to the respective vertical leg portions 42 of each of the tines, in order to maintain the tines in proper spaced, generally parallel relationship. Alternatively, in the event that the tines 27 are stamped from sheet metal, as shown in FIG. 9, the individual tines may be stamped from merely the lower base portion 40, the vertical leg portion 42 and upper or step portion 44 comprising a single integral sheet of material extending the full width of the tool means, as shown. In this manner, it is not necessary to provide a spacer or connector member corresponding to the member 62 utilized with the rounded spring rods.

A slightly modified form of this embodiment of the invention is shown in FIG. 8, the sole difference between this modified form and that previously described being that the generally U-shaped portion of the bracket 25 is squared off, so that upper and lower leg portions 56 and 58 extend generally horizontally, and base portion 60 extends generally perpendicularly thereto.

It is contemplated that numerous modifications other than those shown can be made to the gutter cleaner according to this invention. For example, the gutter cleaner may be designed to be operated by pulling the tines along the gutter rather than by pushing them as shown, and in such a case it is preferable that the tool holder 30 and the tines be positioned at an angle rearwardly of the handle 22 as opposed to forwardly thereof, as shown in FIGS. 1 and 2. The gutter-cleaning implement 18 may be utilized as a rake by positioning the head 24 and the tines 27 in substantial alignment with the handle 22 such that the tips of the base portions 40 of the tines 27 will contact the bottom of the gutter.

For cleaning gutters which are supported by hangers or brackets which would not interfere with the longitudinal movement of the cleaning implement 18, the tines 27 may have only a single bend as at the rear of the base portions 40, with the remainder of each of the tines 27 being substantially parallel to the face of the holder 30, similar to the construction of a common lawn or grass rake. As described, however, when the gutters include such hanger spikes such as 48 or 54, the upstanding portions of the present cleaning implement, and particularly the upper portion 46 of the tines shown in FIG. 2, or the base portions 60 of the brackets shown in FIGS. 5 through 9, upon contact of these upstanding portions with the aforementioned bracket or hanger member, serve as a signal to the person standing on the ground that he has pushed the tines 27 as far as possible beneath the bracket or hanger, and must lift the implement to continue the cleaning operation on the opposite side of the hanger.

To avoid any danger from electrical shock, it is preferable that the handle member 22 be fabricated of a nonconductive material such as wood, plastic or the like, or have an outer sleeve of such non-conductive material. However, if lightness in weight is of primary concern and shock hazard from electric power lines is not a problem or is a minimum one, the handle may be fabricated from metal tubing such as steel or aluminum or the like.

Various portions of the implement may be connected together by means of adjustable connections, if desired, so that the position of the holder 30 and the tines 27 can be easily changed to suit the requirements of the job. The material for the tines is preferably spring steel or an equivalent, so as to give resilience and toughness to the tines to thereby extend the life of the implement, and to enable the implement to lift and remove leaves which have become matted down in the gutter.

As a further conceivable modification of the invention, it is obvious that the tool portion thereof may be constructed as a mirror-image of that shown, so that the implement may be readily manipulated by a left-handed person.

The gutter-cleaning implement of the present invention thus provides an easy to use, rugged and highly efficient tool for removing leaves and other debris from roof gutters.

By providing a plurality of separate tool elements in the form of tines or spring fingers which correspond approximately to the contour of the gutter bottom, a thorough and efficient cleaning operation will be assured.

The step-like configuration of the tines is effective to push the debris under and past transversely extending gutter hanger members a sufficient distance so that the implement can be raised out of the gutter and moved past the hanger members to continue with the cleaning operation. The upwardly extending portions of the implement, such as the portion 46 in FIG. 2 or the base portion 60 in FIGS. 5 to 9, are located a sufficient distance rearwardly of the usable or working portions of the tines 27 to provide a useful signal to the person manipulating same that he has reached such a transverse gutter hanger.

By providing a plurality of fulcrums rearwardly of the tips of the tines, matted down leaves or other hard to remove substances which tend to adhere to the bottom of the gutter can be readily dislodged by the upward lifting movement or prying action of the tips of the tines which is produced by pivoting the implement about these fulcrums.

Additionally, the forwardly extending horizontal base portions of the tines provide an effective device for lifting the debris out of the gutter, especially when the debris is pushed against an end wall of the gutter and the implement is moved upwardly with the tips of the tines slidably contacting this end wall.

By constructing a gutter-cleaning implement according to the above-detailed description, it should now be apparent that all of the objects set forth at the outset to the specification have been successfully fulfilled.

Accordingly, what is claimed is:

1. A gutter-cleaning implement adapted to be manipulated by a person standing on the ground to remove leaves and other debris from an elevated roof gutter or the like, comprising elongated handle means having a lower end adapted to be manually held by said person and an upper end adapted to reach said gutter when the implement is in operative position; tool holder means connected to said upper end of the handle and having a plurality of tool elements extending generally horizontally when in operative position, at least a portion of each of said tool elements extending along and engaging the bottom of said gutter; and said tool elements having an overall step-like configuration and including a generally horizontal lower base portion extending along and engaging the bottom of said gutter, a substantially vertical leg portion secured to one end of said base portion, and a generally horizontal step portion secured at one end thereof to said leg portion and at the other end thereof to said tool holder means, said step poriton being spaced above said base portion.

2. An implement as defined in claim 1, wherein said tool elements are disposed on said tool holder such that the free ends of the base portions substantially correspond to the contour of the bottom of said gutter when said implement is in operative position.

3. An implement as defined in claim 1, wherein said substanitally vertical leg portions have a length less than the height of a transversely extending gutter hanger member above the bottom of said gutter, whereby said base portions and said step portions of said tool elements are adapted to pass freely beneath said hanger member during longitudinal movement of said implement along said gutter.

4. An implement as defined in claim 1, wherein said tool elements are fabricated of a resilient, hard material, and have circular cross-sections.

5. An implement as defined in claim 4, wherein each of said tool elements is secured individually to said tool holder means.

6. An implement as defined in claim 1, wherein said tool elements are fabricated of a resilient, hard material and have rectangular cross-sections.

7. An implement as defined in claim 1, wherein said tool holder means is connected to said handle means by a bracket member extending rearwardly from said handle means relative to the free ends of said tool elements, whereby said implement is substantially balanced relative to said handle means.

8. An implement as defined in claim 7, wherein said bracket means is substantially U-shaped and comprises a pair of leg portions and a base portion, said base portion being disposed rearwardly of said handle means, one of said leg portions being secured to said handle means and the other of said leg portions being secured to said tool holder means.

References Cited

UNITED STATES PATENTS 3,041,655   7/1962   Entler ———————— 15—236 UX
3,023,971   3/1962   Milhous ——————— 401—263 X LEON G. MACHLIN, Primary Examiner U.S. Cl. X.R.

294—19, 55.5